United States Patent Office 3,235,381
Patented Feb. 15, 1966

3,235,381
THREE-DIMENSIONAL PHOTOGRAPH AND LIGHT SENSITIVE ELEMENT FOR PREPARING SAME
Theophilus A. Feild, Jr., Charleston, W. Va., and Prem P. Singh, Afton, Va., assignors to Union Carbide Corporation, a corporation of New York
No Drawing. Filed Oct. 25, 1962, Ser. No. 233,138
4 Claims. (Cl. 96—27)

This invention relates generally to photographs and processes for producing photographs and, more particularly, to photographs which on viewing show a three-dimensional effect.

Heretofore, excellent photographs in black and white and in color have been obtained by printing on sensitized paper with suitable negatives. Transparencies have been likewise produced on sensitized glass plates and on transparent film. However, all these photographs are two dimensional, i.e., in a single plane, and for depth depend on a high degree of shading.

In order to provide a true three-dimensional effect to pictures, various means have been employed. For example, by the well-known stereoscopic viewing technique, two photographs of the same subject are viewed simultaneously through a suitable viewing arrangement which gives the effect of seeing a single subject slightly offset, thus creating the illusion of three dimensions. In the modern Cinemascope process, at least three photographs of the same subject, taken at different angles, are simultaneously projected on a large curved screen. The slight offsets of the different pictures provide a three-dimensional effect to the viewer. In still another motion picture method, the viewer wears polarized glasses which cause two projected, slightly offset, pictures to be seen as a single subject in three dimensions.

It is evident from the aforedescribed state of the art that it is possible to create the illusions of reality in a picture to various degrees, depending on the extent to which a third dimension can be added to the picture. In the normal two-dimensional pictures, excellent detail is realized, but the sensation or realization of depth is missing. By viewing a projection of multiple photographs, realistic illusions of depth can be created.

It is the main object of the present invention to provide a single photograph which on viewing provides a sensation of depth.

It is another object of the invention to provide a photograph which actually has three dimensions.

It is a further object of the invention to provide a process for producing such photographs.

It is a still further object to provide a photographic printing medium for producing such photographs.

Other aims and advantages of the invention will be apparent from the following description and appended claims.

In accordance with the present invention, there is provided a three-dimensional photograph comprising a photographic image printed on a sheet of translucent foam material having interconnecting cells, portions of the image being formed within the interconnecting cells to give depth to the image. There also is provided a process for producing such a three-dimensional photograph comprising impregnating a sheet of transulcent foam material having interconnecting cells with a photographic emulsion, and then forming a photographic image on the foam material by exposing, developing, and fixing the photographic emulsion impregnated therein. In addition, there is provided a photographic printing medium comprising a translucent sheet of foam material having interconnected cells and impregnated with a photographic emulsion.

The foam sheeting material used in this invention must be capable of transmitting light at least to the depth required in the final photographic image, and the material from which the foam material is made should be transparent when in thin film form. The foam sheeting must also have an interconnecting cell structure, i.e., a cell structure which permits the free passage of air and water through the foam mass. This is necessary so that the photosensitive agent can be located throughout the foam to the desired depth and so that the image can be subsequently developed and fixed in the exposed structure. Typical examples of foams which meet these requirements are the flexible polyurethanes. A typical flexible polyurethane foam has at least about 90 percent of the foam structure as interconnecting cells and, if desired, this number can be increased by crushing the foam sheeting. One specific polyurethane foam which has proved useful in this invention is characterized by the following properties (ASTM Procedures):

Tensile strength—14.4 lbs./square inch
Elongation, percent—286
Tear—2.5 lbs./square inch
Load bearing 4″ RMA—(lbs./50 square inches):
    65% deflection—55
    Density lbs./ft.$^3$—1.8
50% Compression set, percent—5.9

The pore or cell size of the foam material is not critical and can be varied to provide different effects and degrees of sharpness in the image. For example, a large mural to be viewed at some distance would require a thicker foam with a larger cell size than a small picture to be viewed at arm's length. The thickness of the foam sheeting is generally governed by the type of picture to be printed and the mode of light to be used in viewing, whether reflected or transmitted.

The foam sheeting is prepared for exposure by treating it with a conventional photosensitive material. This treatment should be such that the photosensitive agent penetrates into the foam at least to the depth desired in the final image. The photosensitive material may be applied to the foam sheeting in any conventional manner. For example, the foam sheeting may be soaked one or more times in a diluted emulsion of sensitizing agent and then passed through squeeze rolls to remove excess emulsion, or the emulsion may be simply padded onto the sheeting and then high pressure squeeze rolls used to remove excess emulsion. Similarly, the foam sheeting may be treated with a backwetting agent and then padded with the sensitizing agent and dried, or the sheeting can even be soaked by hand dipping in a diluted emulsion and then dried. In one preferred form of the invention, a ⅛-inch thick sheet of flexible polyurethane foam having a density of 1.8 pounds per cubic foot and an interconnecting cell structure is thoroughly impregnated with an emulsion of Du Pont Photographic Emulsion DH. After drying, there is a coating of photosensitive material on the walls of the foam cells. The sensitized sheeting is then overtreated with a gelatin solution and dried to stabilize the sensitizer and facilitate subsequent developing and fixing after exposure. The sensitized sheet is then exposed by employing an ordinary negative and developed, fixed, washed, and dried in accordance with any normal photographic developing and fixing process. Since the photosensitive coating on the cell walls is exposed and developed throughout the foam sheeting, the result is a photographic image printed on the foam material with portions of the image actually being formed in the interconnecting cells.

Since the photosensitive material is developed in depth within the foam material, the resulting developed image actually has three dimensions. One rather unusual effect is obtained with portraits which, when viewed at different angles, give the illusion of a head continuously shifting to face the viewer. This is a true indication of the three-dimensional character of the photograph. When the foam sheeting is sufficiently thin that the image is developed through the entire thickness of the sheeting, the image is also developed on the back or unexposed side of the sheet since light passes through the foam mass. The depth or three-dimensional effect is very striking when such a photograph is viewed from the back side with soft transmitted light.

*Examples*

In one example of the present invention, a ⅛-inch thick sheet of flexible polyurethane foam having a density of 1.8 pounds per cubic foot (ASTM) with an interconnected cell structure was first treated with a 0.5% solution of photographic grade gelatin and then dried. The sheeting was then thoroughly impregnated with Du Pont Photographic Emulsion by soaking and working the sheeting by hand in diluted emulsion having a ratio of 10 parts of water to 1 part of emulsion and dried so as to form a coating of the emulsion on the cell walls throughout the sheeting. The sheeting was then finally treated with a 0.5% solution of photgraphic grade gelatin and dried. The sensitized foam sheeting was next used as a printing medium on which a projection of a portrait from a standard photographic negative was made using an enlarger. The exposed sheeting was then developed and fixed employing a normal photographic developing and fixing process. The developed image was in depth through the entire thickness of the sheeting, that is, the image was on the face of the sheeting, on the back side, and also between the surfaces on the cell walls. The photograph when viewed gave the sensation of depth, and when viewed from a distance of several feet from different angles provided the illusion that the portrait subject was moving to follow the viewer. When the image was viewed from the reverse side with soft transmitted light, an even greater sensation of depth and realism was obtained.

In another example of the invention, the procedure described in the example above was followed except that the initial and final gelatin treatments were omitted, and a 20 to 1 water to emulsion ratio was employed. The resulting photograph showed improved detail and refinement of the depth effect.

The photographs of this invention do not require expensive materials in their production, nor new skills not currently available in the industry. Also, the process is not limited to black and white prints. For these reasons, the photographs have great utility in the photographic arts in general, and in particular for portraits, murals, and advertising media. This invention also has utility in the field of medicine, particularly in X-ray technology where depth in a photograph can be of great value.

What is claimed is:

1. A three-dimensional photograph comprising a photographic image printed on and within a sheet of translucent polyurethane foam, said polyurethane foam being characterized by an interconnecting cell structure capable of permitting the free passage of fluids, portions of said image being formed within said interconnecting cell structure to give depth to said image, and said foam sheet being of sufficient thickness to impart a three-dimensional appearance to the photograph.

2. A three-dimensional photograph comprising a photographic image printed on and within a sheet of flexible, translucent polyurethane foam having at least about 90 percent of its structure in the form of interconnecting cells, portions of said image being printed on the walls of said interconnecting cells to give depth to said image, and said foam sheet being of sufficient thickness to impart a three-dimensional appearance to the photograph.

3. A photographic printing medium for the production of three-dimensional photographs which comprises a sheet of translucent polyurethane foam having an interconnecting cell structure capable of permitting the free passage of fluids and, incorporated within said cell structure, a photosensitive composition capable of forming a photographic image upon exposure, development and fixing thereof, said foam sheet being of sufficient thickness to impart a three-dimensional appearance to a photograph printed therein.

4. A photographic printing medium for the production of three-dimensional photographs comprising a sheet of flexible, translucent polyurethane foam impregnated with photographic emulsion, said polyurethane foam having at least about 90 percent of its structure in the form of interconnecting cells, the walls of said cells being coated with said photographic emulsion, and said foam sheet being of sufficient thickness to impart a three-dimensional appearance to a photograph printed therein.

References Cited by the Examiner

UNITED STATES PATENTS

| | | | |
|---|---|---|---|
| 2,017,853 | 10/1935 | Eichstadt | 96—94 |
| 2,917,217 | 12/1959 | Sisson. | |
| 2,949,361 | 8/1960 | Agers | 96—27 |
| 3,013,901 | 12/1961 | Bugosh | 260—2.5 |

FOREIGN PATENTS 413,178   7/1934   Great Britain.

NORMAN G. TORCHIN, *Primary Examiner.*